US012686086B2

(12) United States Patent

Rousseau

(10) Patent No.: US 12,686,086 B2
(45) Date of Patent: Jul. 21, 2026

(54) FASTENER TIGHTENING CONTROL SYSTEM IN AN ASSEMBLY AND METHOD FOR CONTROLLING THE TIGHTENING OF A FASTENER IN AN ASSEMBLY

(71) Applicant: LISI AEROSPACE, Paris (FR)

(72) Inventor: Clément Rousseau, Osny (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 19/218,417

(22) Filed: May 26, 2025

(65) Prior Publication Data

US 2025/0381631 A1 Dec. 18, 2025

(30) Foreign Application Priority Data

Jun. 13, 2024 (FR) ...................................... 2406286

(51) Int. Cl.
| | |
|---|---|
| *B23P 19/06* | (2006.01) |
| *F16B 31/02* | (2006.01) |
| *G01L 5/24* | (2006.01) |
| *G01N 29/07* | (2006.01) |
| *G01N 29/12* | (2006.01) |

(52) U.S. Cl.
CPC .............. *B23P 19/06* (2013.01); *G01L 5/246* (2013.01); *G01N 29/07* (2013.01); *G01N 29/12* (2013.01); *B23P 2700/01* (2013.01); *F16B 2031/022* (2013.01)

(58) Field of Classification Search
CPC ......... B23P 19/06; B23P 19/065; B23P 19/07; B25B 21/00–002; B25B 23/14–1405; B25B 23/147–1475; B21J 15/022; B21J 15/142; B21J 15/28–285; F16B 2031/022; G01L 1/255; G01L 5/246; G01N 29/07; G01N 29/12
See application file for complete search history.

(56) References Cited

U.S. PATENT DOCUMENTS 3,822,587 A 7/1974 Makino et al.
3,918,294 A * 11/1975 Makino .................. B25B 23/14
73/761

(Continued)

FOREIGN PATENT DOCUMENTS

CN 109813474 A * 5/2019
CN 112577653 A * 3/2021 ............. G01L 5/246

(Continued)

OTHER PUBLICATIONS

Search Report dated Dec. 11, 2024 for FR App. Ser. No. 2406286.

*Primary Examiner* — Matthew P Travers
(74) *Attorney, Agent, or Firm* — Henricks Slavin LLP

(57) ABSTRACT

A system for controlling the tightening (10) of a fastener (12) in an assembly (36). The fastener (12) has a rod (14) and an assembly member (16). The control system (10) includes a first measuring device (44) suitable for measuring a first parameter representative of the temporal response of the rod (14) to ultrasonic excitation, a second measuring device (46) suitable for measuring a second parameter representative of the frequency response of the rod (14) to ultrasonic excitation, and a calculator (48) suitable for determining a value of the rod tightening (14) as a function of at least the first parameter and the second parameter.

10 Claims, 4 Drawing Sheets

(56)    References Cited

U.S. PATENT DOCUMENTS

Figure 1:
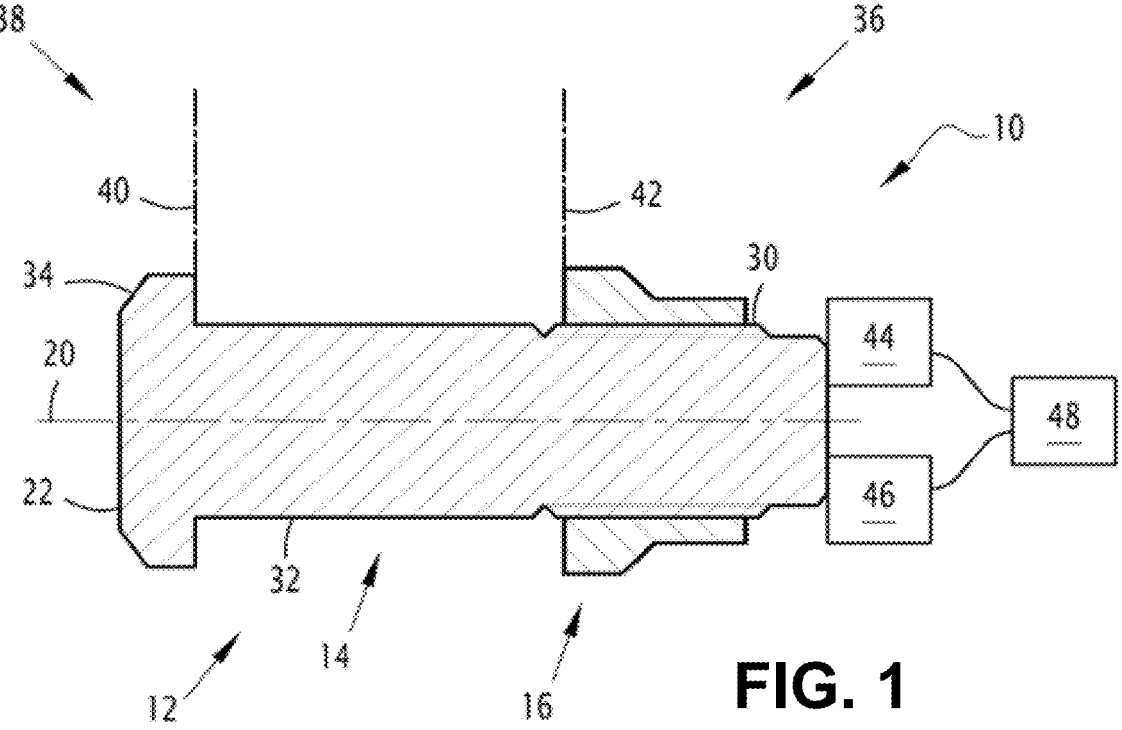

| | | | | |
|---|---|---|---|---|
| 4,846,001 | A | * | 7/1989 | Kibblewhite ........... G01L 5/246 |
| | | | | 73/761 |
| 4,899,591 | A | | 2/1990 | Kibblewhite |
| 5,216,622 | A | * | 6/1993 | Kibblewhite ......... G01N 29/07 |
| | | | | 73/761 |
| 5,343,785 | A | * | 9/1994 | Holt ................... B25B 23/1425 |
| | | | | 73/761 |
| 5,493,913 | A | * | 2/1996 | Layer ................. B25B 23/1405 |
| | | | | 73/761 |
| 5,970,798 | A | | 10/1999 | Gleman et al. |
| 2002/0023503 | A1 | * | 2/2002 | Schneider ........... G01N 29/227 |
| | | | | 73/761 |
| 2013/0192389 | A1 | * | 8/2013 | Carlin ...................... G01L 5/246 |
| | | | | 73/862.21 |
| 2015/0316435 | A1 | * | 11/2015 | Persson ................ G01L 5/0042 |
| | | | | 81/429 |
| 2024/0240976 | A1 | * | 7/2024 | Li .......................... G01D 21/02 |
| 2024/0302235 | A1 | * | 9/2024 | Wang ...................... G01L 5/246 |

FOREIGN PATENT DOCUMENTS

| | | | | | |
|---|---|---|---|---|---|
| CN | 116465537 | A | | 7/2023 | |
| DE | 102023124319 | A1 | | 3/2024 | |
| EP | 2184136 | A1 | * | 5/2010 | ............. B25B 23/14 |
| GB | 2037430 | A | * | 7/1980 | ......... B25B 23/1425 |
| KR | 102351656 | B1 | * | 1/2022 | ........... G01L 3/1464 |
| KR | 102446367 | B1 | * | 9/2022 | ........... G01L 3/1464 |
| WO | WO-2024110510 | A1 | * | 5/2024 | ............. G01L 5/246 |

* cited by examiner

FASTENER TIGHTENING CONTROL SYSTEM IN AN ASSEMBLY AND METHOD FOR CONTROLLING THE TIGHTENING OF A FASTENER IN AN ASSEMBLY

The present invention relates to a system for controlling the tightening of a fastener in an assembly. It also relates to a corresponding control process.

The invention applies particularly, but not exclusively, to the tightening control of aircraft fasteners.

In the aeronautical field, it is useful to know the preload of an installed fastener, especially a screw/nut type fastener. The preload of a fastener is the mechanical tightening initially created in the fastener when it clamps an assembly of parts, during the manufacture of an aircraft for example. Precise knowledge of the installed tightening is essential to ensure the durability of the assembly over time, under the effect of external constraints. Indeed, a too intense tightening can deteriorate the screw or the part in which it is screwed, and too little tightening can lead to the screw decoupling from the assembly.

In particular, it is useful to be able to control the evolution of the tightening over time, in order to plan maintenance operations. A known method of knowing the tightening in a screw is to measure the elongation of the screw by ultrasonic waves. However, this method requires two measurements, one in the unconstrained free state, and one in the tighten state. In addition, it is not possible to measure the tightening via elongation measurement, for example during a maintenance operation, if the measurement in the free state of the fastener during the manufacture of the aircraft is not saved in a database, which is then made available to a third party carrying out the maintenance operation.

It is known that there are techniques that make it possible to know the tightening in a screw already installed in its nut even if the initial state is not known.

In particular, a process based on the exploitation of the propagation of longitudinal (according to the axis of the screw) and transverse (with normal incidence at the axis of the screw) ultrasonic waves can be used. For example, by knowing the flight times of each of the two types of waves, it is possible to go back to the tightening of the screw.

However, in practice, the transmission of transverse waves is limited, so that complex and cumbersome sensors are used.

In addition, this process gives highly dispersive measurements for titanium alloy screws, an alloy widely used in aircraft, and the measurements are very sensitive to temperature variations.

There is therefore a need for a rod tightening control system for a fastener in an assembly that is easier to implement and can be used for any type of rod.

To this end, the description describes a system for controlling the tightening of a fastener in an assembly, said fastener comprising a rod and an assembly member, the control system comprising:

a first measuring device, the first measuring device being suitable for controlling a first parameter representative of the temporal response of the rod to ultrasonic excitation, a second measuring device, the second measuring device being suitable for controlling a second parameter representative of the frequency response of the rod to ultrasonic excitation, and a calculator, the calculator being suitable for determining a value of the rod tightening according to at least the said first parameter and said second parameter.

Depending on the particular embodiment, the control system shall have one or more of the following characteristics, taken in isolation or in all technically feasible combinations thereof:

a first parameter is the time of flight of a longitudinal or transverse ultrasonic wave in the rod, a second parameter is a frequency interval between two resonant frequencies of the stem, the calculator also determines the value of the rod tightening based on a rod parameter, and the calculator calculates the value F of the rod tightening by applying the following formula:

$$F = \frac{1}{\kappa}\sqrt{1 - t_\sigma \cdot f_\sigma^1}$$

where:

$\kappa$ means the rod parameter, $t_\sigma$ means the time of flight of an ultrasonic excitation in the stressed rod, and $$f_\sigma^1$$

means to the frequency interval between two resonant frequencies of the rod under stress.

The first measuring device may comprise:

a first ultrasonic probe arranged to generate an ultrasonic excitation of the rod and collect a rod response signal to the generated excitation, a first acquisition device, the first acquisition device being suitable for controlling the first ultrasonic probe according to a first control law and receiving the response signal, the first control law being an impulse law, and a first computing device, the first computing device being suitable for processing the response signal to extract the first parameter.

When the first measuring device of the preceding paragraph is employed, a main axis is defined for the rod and the first ultrasonic probe is arranged to generate an ultrasonic excitation propagating along the main axis of the rod.

The second measuring device may comprise:

a second ultrasonic probe arranged to generate an ultrasonic excitation of the rod and collect a plurality of rod response signals to the generated excitation, a second acquisition device, the second acquisition device being suitable for controlling the second ultrasonic probe according to a second control law and receiving the plurality of response signals, the second control law comprising a pulse train at different frequencies, and a second computing device, the second computing device being suitable for processing the plurality of response signals to extract the second parameter.

When the second measuring device of the preceding paragraph is employed, the second computing device may be suitable for carrying out a frequency analysis of the plurality of response signals.

When the first and second measuring devices of the preceding paragraphs is employed, the first ultrasonic probe and the second ultrasonic probe may be merged and comprise an ultrasonic transducer made of lead titano-zirconates.

The description also describes a method for controlling the tightening of a fastener in an assembly, said fastener comprising a rod and an assembly member, the method of testing comprising the steps of:

measurement of a first parameter of the rod's temporal response to ultrasonic excitation, measurement of a second parameter of the frequency response of the rod to an ultrasonic excitation, and determination of the value of the rod tightening as a function of at least the said first parameter and the second parameter.

In this description, the term "suitable for" means "adapted for", "adapted to" or "configured for".

Figure 2:
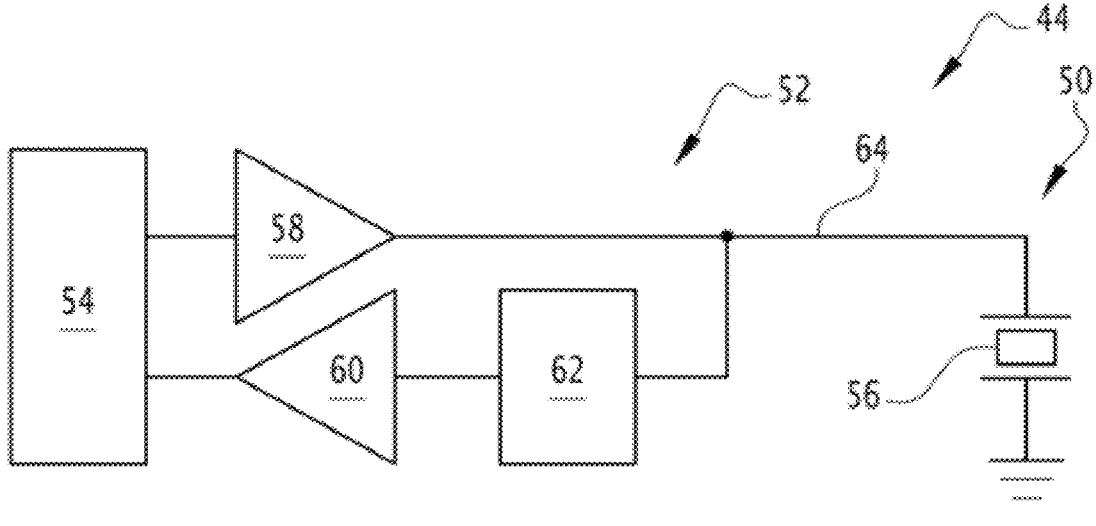
Figure 3:
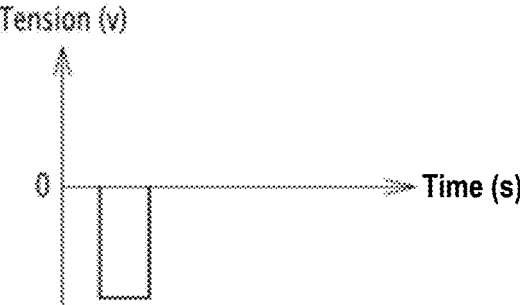
Figure 3:
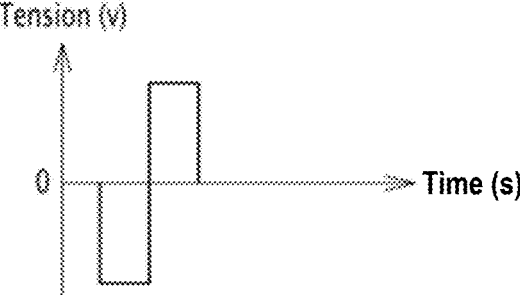
Figure 3:
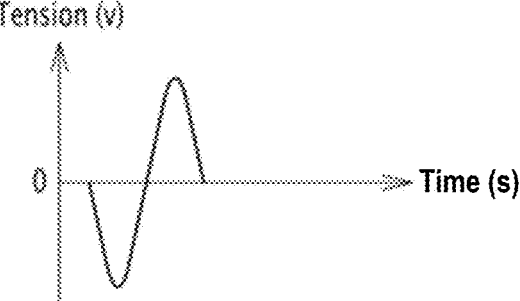
Figure 4:
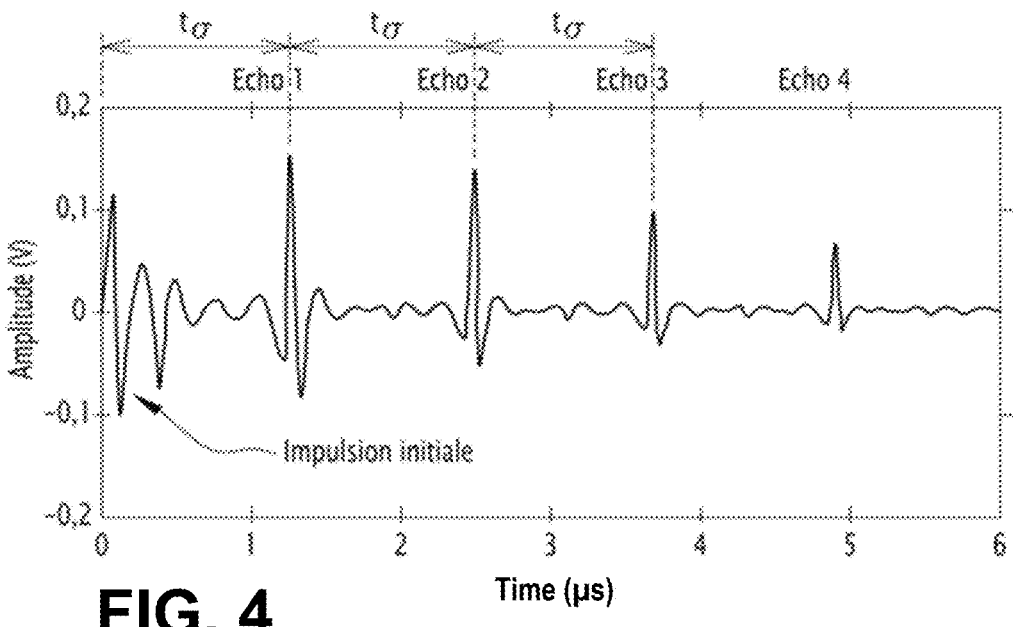
Figure 5:
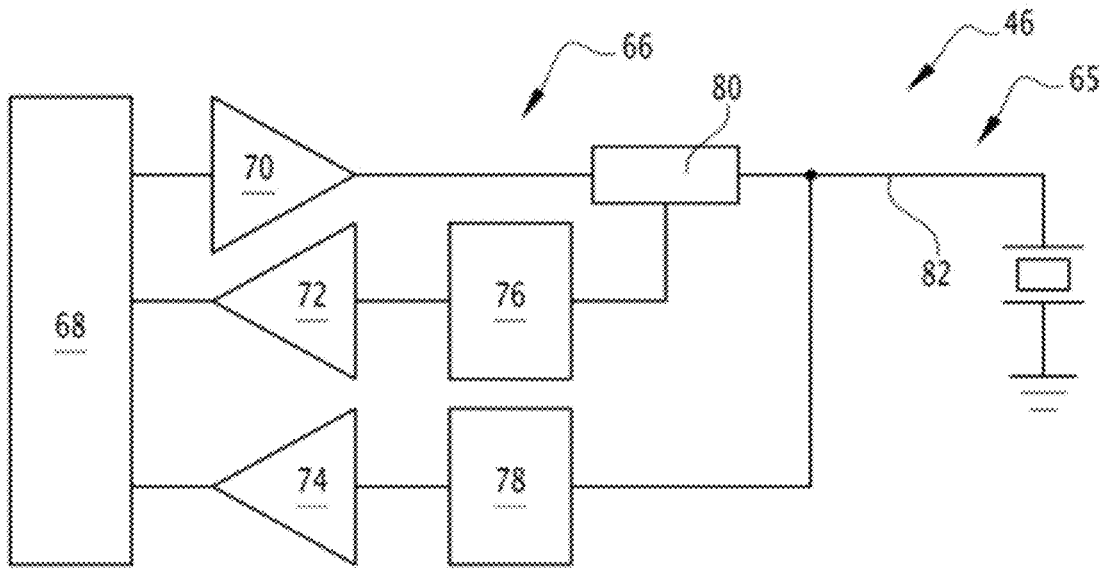
Figure 6:
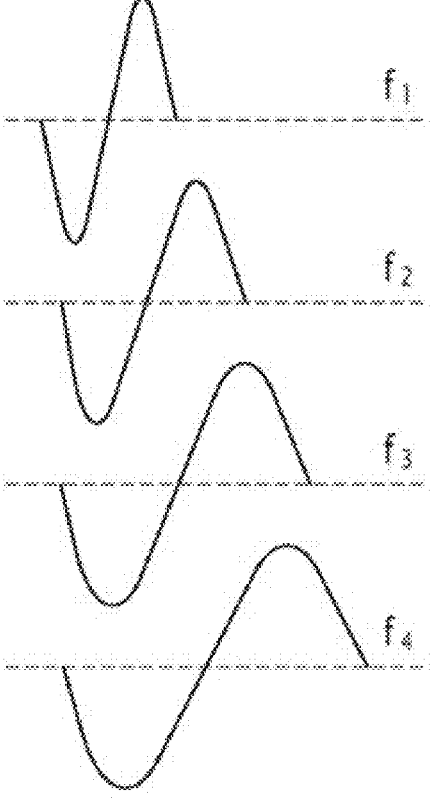
Figure 7:
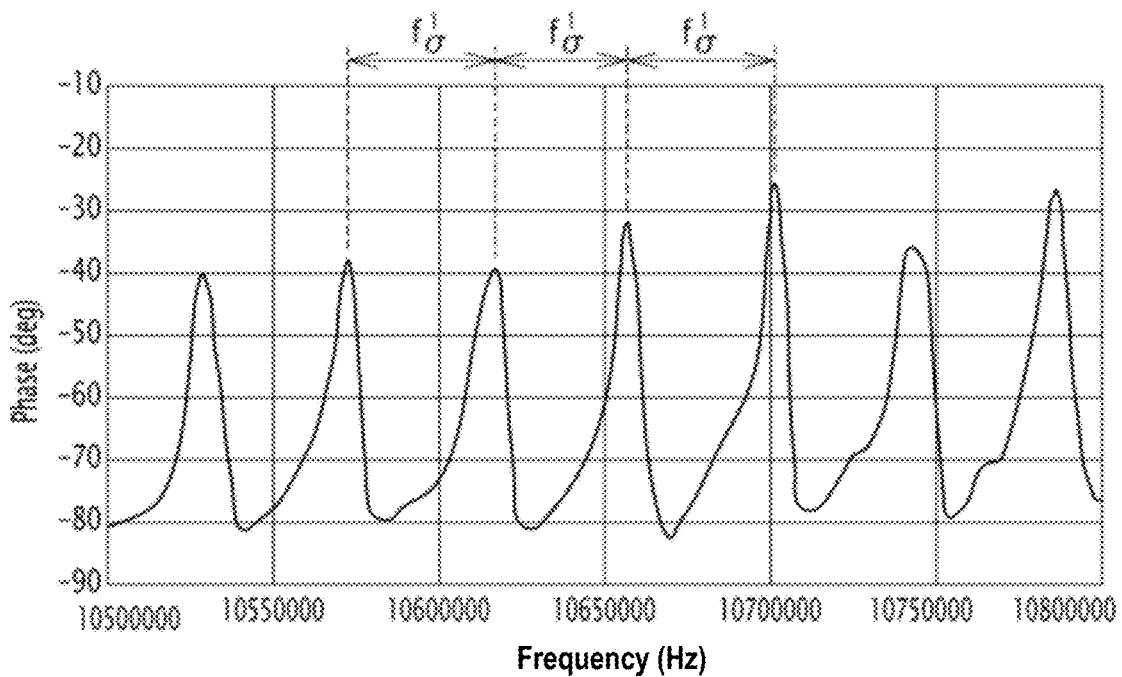
Figure 8:
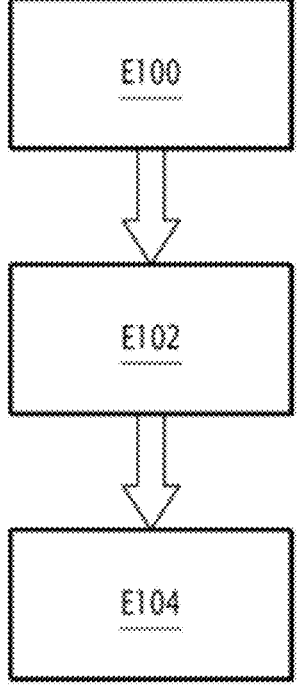

Features and advantages of the invention will appear on reading the following description, given only as a non-exhaustive example, and made with reference to the attached drawings, on which:

FIG. 1 is a schematic representation of a screw tightening control system, the control system comprising a first measuring device and a second measuring device, FIG. 2 is a block diagram of the first control device in FIG. 1, FIG. 3 is a schematic representation of several control laws that the first measuring device in FIG. 2 is adapted to use, FIG. 4 is a schematic representation of a signal backscattered by the screw that the first measuring device in FIG. 2 is adapted to receive, FIG. 5 is a block diagram of the second measuring device in FIG. 1, FIG. 6 is a schematic representation of a control law that the second measuring device in FIG. 5 is adapted to use, FIG. 7 is a schematic representation of a signal obtained by the second measuring device after processing the backscattered signals by the screw in the presence of an excitation corresponding to the control law of FIG. 6, and FIG. 8 is a flowchart of an example of the implementation of a tightening control process.

A control system 10 is shown in FIG. 1.

The control system 10 is suitable for controlling the tightening of a fastener 12, which is also visible in FIG. 1.

Fastener 12 comprises a rod 14 and an assembly component 16. Rod 14 and assembly member 16 are shown in cross-section.

Rod 14 extends along a first axis 20 between a first end and a second end. Rod 14 comprises a flat face 22, perpendicular to the first axis 20, forming said first end.

Rod 14 also comprises an assembly element 30, arranged on a radial surface of said rod 14. Assembly element 30 is capable of cooperating with assembly member 16 so as to form fastener 12 from rod 14 and assembly member 16.

In the embodiment represented, the rod 14 is a screw and assembly element is a threaded portion 30 of said screw 14. Screw 14 also includes a smooth 32 shank, aligned with the threaded portion 30 according to the first axis 20.

In the embodiment depicted, screw 14 also has an enlarged head 34, adjacent to the smooth shank 32. The head 34 forms a radial projection in relation to said shank 32.

In the embodiment depicted, the flat face 22 of screw 14 is formed by the head 34.

As mentioned above, the assembly member 16 is suitable for joining to the assembly element 30 of the screw 14 to form the fastener 12.

In the embodiment represented, the assembly member 16 is a threaded nut 16, suitable for joining to the threaded portion 30 of screw 14.

In particular, fastener 12 is capable of forming an assembly 36 with structural elements 38, superimposed in such a way as to present a first 40 and a second 42 opposite faces.

In assembly 36, the shank 32 of screw 14 is arranged in a hole (not shown) of the structural elements 38; the head 34 is resting against the first face 40; and nut 16 is assembled to the threaded portion 30 of screw 14 and rests against the second face 42. A clamping tightening is applied to screw 14 by tightening nut 16.

The control system 10 is suitable for controlling the tightening of a fastener 12 by determining a tightening value of the rod 14.

The control system 10 consists of a first measuring device 44, a second measuring device 46 and a calculator 48.

The first measuring device 44 is suitable for measuring at least one first parameter representative of the temporal response of the screw 14 to ultrasonic excitation.

The temporal response is the variation of the backscattered signal (or echo) by screw 14 over time.

According to the example described, the first parameter that the first measuring device 44 is suitable for measuring is the time of flight of a longitudinal ultrasonic excitation in screw 14.

The time of flight is the propagation time of the ultrasonic excitation. The time of flight thus corresponds to the time elapsed between the moment of emission of the ultrasound excitation by a transducer and the reception of the excitation echo by the same transducer. For the rest of the description, the flight time is noted $t_o$.

Ultrasonic excitation can also be a transverse ultrasonic excitation.

Another example of a first parameter is the time shift of the resonant frequency of the screw 14 induced by one or the injected ultrasonic waves.

As can be seen in FIG. 2, the first measuring device 44 comprises a first ultrasonic probe 50, a first acquisition device 52 and a first computing device 54.

The first ultrasonic probe 50 is arranged to generate an ultrasonic excitation of the screw 14 and collect a response signal from the screw 14 to the generated excitation.

More precisely, the first ultrasonic probe 50 is an axial probe in the sense that the first ultrasonic probe 50 is arranged to generate an ultrasonic excitation propagating along the main axis of the screw 14.

According to the example described, the first ultrasonic probe 50 is a transducer with a piezoelectric sensor 56.

As its name suggests, the sensor 56 is made of a piezoelectric material, i.e. a material capable of converting an electrical signal into an acoustic signal and vice versa an acoustic signal into an electrical signal.

Advantageously, the piezoelectric material is a lead titano-zirconates, for example PZT-4 or PZT-8 corresponding to types I and III of the MIL-STD-1376B standard, respectively.

The use of such materials makes it possible to obtain a transducer with a high mechanical quality factor: such a material will tend to resonate for a long time in response to an excitation.

The first acquisition device 52 is an electronic control circuit of the first ultrasonic probe 50.

The first acquisition device 52 is suitable for controlling the first ultrasonic probe 50 according to a first control law and for receiving the backscattered signal.

Examples of the first control law are shown in FIG. 3.

Each first control law is an impulse law, i.e. it consists only of electrical impulses (in volts) as a function of time (e.g. in seconds).

More precisely, in the case of FIG. 3, each first control law has at least one pulse, either half-periodic or periodic.

The first case shown at the top of FIG. 3 corresponds to a semi-periodic negative unipolar rectangular pulse, the second case represented in the middle of FIG. 3 corresponds to a periodic bipolar rectangular pulse (two semi-periodic pulses of opposite sign) and the third case at the bottom of FIG. 3 corresponds to a bipolar sinusoidal pulse (two semi-periodic pulses of opposite sign).

The first acquisition device 52 consists of a first transmitter 58, a first receiver 60 and a first isolation unit 62.

The first transmitter 58 is suitable for transmitting the electrical signal corresponding to the first control law.

The first transmitter 58 is connected to the first ultrasonic probe 50 by an electrical path 64 through which the first control law passes.

The first receiver 60 is suitable for receiving the electrical signal corresponding to the backscattered signal received by the first ultrasonic probe 50.

The first isolation unit 62 is suitable for isolating the first receiver 60 from the first transmitter 58.

Thus, the first isolation unit 62 is suitable for protecting the first receiver to avoid an input emission of too high electrical voltage.

The first computing device 54 is suitable for processing the response signal to extract at least one first parameter, in this case the time of flight $t_\sigma$.

FIG. 4 illustrates the backscattered signal received by the first receiver where the initial pulse is highlighted by an arrow.

The difference between the echoes corresponds to the sought time of flight $t_\sigma$.

Depending on the case, the difference can be measured directly or by using an average.

For example, one can measure the deviation for three echoes and divide by three or measure the deviation with the first echo, the deviation between the first echo and the second echo and the deviation between the second echo and the third echo and average the three values to obtain the time of flight $t_\sigma$.

As shown in FIG. 5, the second measuring device 46 comprises a second ultrasonic probe 65, a second acquisition device 66 and a second computing device 68.

The second measuring device 46 is suitable for measuring at least a second parameter representative of the frequency response of the screw 14 to an ultrasonic excitation.

The frequency response is a reconstruction of the backscattered signals for each excitation frequency according to a second control law, for example described in FIG. 6. An example of such a reconstruction is shown in FIG. 7.

According to the example described, the second parameter that the second measuring device 46 is suitable for measuring is a frequency interval $$f_\sigma^1$$

between two or more consecutive resonant frequencies of the screw 14.

The second parameter is, according to a similar variant, a set of resonant frequencies of screw 14.

The same remarks as for the first ultrasonic probe 50 apply to the second ultrasonic probe 68.

Advantageously, the first ultrasonic probe 50 and the second ultrasonic probe 68 are combined.

The first measuring device 44 and the second measuring device 46 therefore use the same ultrasonic probe, which allows to reduce the compactness of the control system 10.

The second acquisition device 66 is an electronic control circuit for the second ultrasonic probe. The second acquisition device 66 is suitable for controlling the second ultrasonic probe 65 according to a second control law and for receiving the plurality of response signals.

An example of a second control law is shown in FIG. 6.

As can be seen in this figure, the second control law has a train of pulses at different frequencies.

More precisely, it is a series of sinusoidal pulses of the same amplitude but of different frequencies (here f1, f2, f3 and f4 but this number is not limiting).

The second acquisition device 66 consists of a second transmitter 70, a second receiver 72, a third receiver 74, a second protection unit 76, a third protection unit 78 and a calibrated resistor 80.

The second transmitter 70 is suitable for transmitting the electrical signal corresponding to the second control law.

The second transmitter 70 is connected to the second ultrasonic probe 65 by an electrical path 82 through which the second control law passes.

The second receiver 72 is suitable for receiving the electrical signal corresponding to the backscattered signal picked up by the second ultrasonic probe 65 after passing through the calibrated resistor 80. The calibrated resistor 80 forms here a shunt.

The second isolation unit 76 is suitable for isolating the second receiver 72 from the second transmitter 70.

Thus, the second isolation unit 76 is suitable for protecting the second receiver 72 to avoid an input emission of a too high electrical voltage.

The same remarks apply to the third receiver 74 and the third isolation unit 76.

The only difference is that the third receiver 74 is directly connected to the second ultrasound probe 65 (no shunt).

The presence of the two receivers 72 and 74 arranged in this way and the calibrated resistor 80 makes it possible to analyze the impedance variation related to the pulse trains.

The second acquisition device 46 thus plays the role of an impedance analyzer. The second acquisition device 46 can be a vector network analyzer, commonly referred to by the abbreviation VNA.

The second computing device 68 is suitable for processing the response signal to extract at least a second parameter, in this case the frequency interval $$f_\sigma^1$$

between two resonant frequencies of screw 14.

To do this, the second computing device 68 performs a frequency analysis reconstructed from the collected signals, for example by a Fourier transform of the collected signals.

FIG. 7 illustrates an example of a curve that may result from such an analysis. Specifically, FIG. 7 shows the phase variation of the impedance of the second ultrasound probe 65 as a function of the pulse frequency applied.

The curve has peaks, each peak corresponding to a resonant frequency of the screw 14. The difference between two peaks corresponds to the sought frequency interval $$f_\sigma^1.$$

The calculator 48 is an electronic circuit designed to handle and/or transform data represented by electronic or physical quantities in calculator registers and/or memories into other similar data corresponding to physical data in register memories or other types of display devices, transmission devices or storage devices.

As specific examples, the calculator 48 includes a single-core or multi-core processor, such as a central processing unit (CPU), a graphics processing unit (GPU), a microcontroller and a digital signal processor (DSP), a programmable logic circuit, such as an application-specific integrated circuit (ASIC), an in-situ programmable gate array (FPGA), a programmable logic device (PLD) and programmable logic networks (PLA), a state machine, a logic gate, and discrete hardware components.

The calculator 48 is suitable for determining the value of the tightening of the screw 14 as a function of at least the first and the second parameter.

To do this, the calculator 48 uses a function having as input variables the said first and second parameters, and gives as an output a calculated value of the tightening of the screw 14.

Depending on the embodiment, the function is more or less complex.

For example, the function is an array that calculator 48 consults to obtain the sought value.

According to another example, the function can be a function that the calculator 48 applies to obtain, after calculation, the sought value.

In this perspective, the function can be a numerical function or a more elaborate function, in particular a neural network that has been previously learned.

The function can also take more input parameters, such as other measurements or predefined values.

According to the example described, the function takes as input another parameter which is a parameter dependent on the geometry of the screw 14 and the material of the screw 14. The parameter dependent on screw 14 is here a constant κ.

The constant is, for example, obtained by measuring the tightening F of screw 14 by preliminary tests on screw 14, for example on a tension bench or an instrumented clamping bench, and by measuring either the resonant frequency to exploit a first relationship, or the propagation delay to exploit a second relation.κ

The first relation is written:

$$-\delta f^n = \kappa.f_0^n.F$$

Where:

$\delta f^n$ is the frequency variation of the $n^{th}$ resonant frequency of screw 14, between an initial state at rest and a state under stress;

$$f_0^n$$

is the $n^{th}$ resonant frequency of screw 14 in an initial state at rest, and F is the tightening of the screw 14.

The second relation is written:

$$\delta t = \kappa.t_0.F$$

8

Where:

$\delta t$ is the variation in the propagation time of the wave in the screw, between an initial state at rest and a state under stress, $t_0$ is the propagation time of the wave in the screw in an initial state at rest, and F is to the tightening of the screw.

From one of these two test campaigns, it is possible to deduce the value of the constant κ. It is obviously possible to carry out both test campaigns, in order to refine the value of the constant κ.

It is advantageous to perform the tests on a screw—or a set of screws—and to consider that the value found for the constant κ is valid for all screws of the same type, e.g. with the same material, diameter and length, from the same batch or from different batches.

By repeating these preliminary tests on different types of screws, the calculator 48 has a database giving a value of the constant κ for a set of screw types, the types of screws differing for example by material, screw diameter and screw length.

In the example described, the calculator 48 uses only the constant κ, the time of flight $t_\sigma$, and the interval $$f_\sigma^1$$

between two resonant frequencies of screw of screw 14 to calculate the tightening F in screw 14, applying the following formula:

$$F = \frac{1}{\kappa}\sqrt{1 - t_\sigma.f_\sigma^1}$$

The calculator 48 thus obtains the value of the tightening of the screw 14, without knowing its initial state, or its previous tightening state if the tightening has already been measured, for example during a maintenance operation.

The operation of the control system 10 is now described with reference to FIG. 8 which illustrates an example of the implementation of a method for controlling the tightening of the screw 14.

The tightening testing process consists of a first measuring step E100, a second measurement step E102 and a determination step E104.

In the first measurement step E100, the first ultrasonic probe 50 emits an ultrasonic excitation in the form of a pulse.

This pulse propagates through the screw 14 and is reflected back to the first ultrasonic probe 50.

By collecting and analyzing the reflected signal, the first measuring device 44 obtains the value of at least one first parameter of the temporal response of screw 14 to an ultrasonic excitation, namely, in the example described the time of flight $t_\sigma$.

In the second measurement step E102, the second ultrasonic probe emits ultrasonic excitation in the form of a pulse train.

Each pulse propagates through screw 14 and is reflected back to the first ultrasonic probe 50.

The second measuring device 46 collects and analyzes the reflected signals.

The second measuring device 46 thus obtains the second parameter of the frequency response of screw 14 to ultrasonic excitation, for example here the frequency interval $$f_\sigma^1$$

9 between two resonant frequencies of screw 14.

In the determination step E104, the calculator 48 applies the following formula:

$$F = \frac{1}{\kappa}\sqrt{1 - t_\sigma . f_\sigma^1}$$

The result of this formula gives the value of the tightening F of screw 14.

The control system 10 thus makes it easy to obtain the tightening of the fastener 12.

Indeed, it is not the initial state of stress in screw 14 to obtain the sought value.

An operator carrying out this check can then decide, on the basis of the tightening value indicated by the calculator 48, whether the fastener must be tightened so that the tightening in fastener 12 is within the recommended tightening range. The operator can check with the same method whether the tightening carried out has made it possible to achieve the recommended tightening range.

In addition, it can be used for all types of screws, including small or already installed screws 14.

In addition, it is possible to implement the invention with only longitudinal waves and to use a single transducer.

Other methods of implementation benefiting from the previous advantages are also possible.

For example, the first measuring device 44 and the second measuring device 46 are grouped together in the same package.

As a variant or as a complement, the calculator 48, the first computing device 54 and the second computing device 56 can be combined.

Advantageously, only a calculator, for example the calculator 48, will implement the processing carried out by the first computing device 54 and the second computing device 56.

The invention has been described for a fastener comprising a threaded rod and a nut. The invention is also applied to any type of fasteners, including, for example, a threaded rod and a swage collar, a swage rivet and a swage collar, or a swaged blind fastener, screwed, or pulled—screwed. To determine the tightening of a blind fastener, the first and second measuring devices 44 and 46 will then be brought into contact with the accessible surface of the fastener, i.e. usually the head of the fastener, the surface of the opposite end being generally not accessible.

The invention claimed is:

1. A control system for controlling the tightening of a fastener in an assembly, said fastener comprising a rod and an assembly member, the control system comprising:
    a first measuring device, the first measuring device being suitable for measuring a first parameter representative of a temporal response of the rod to ultrasonic excitation,
    a second measuring device, the second measuring device being suitable for measuring a second parameter representative of a frequency response of the rod to ultrasonic excitation, and
    a calculator, the calculator being suitable for determining a value of the rod tightening as a function of at least said first parameter and said second parameter.

2. The control system according to claim 1, wherein the first parameter is a time of flight of a longitudinal or transverse ultrasonic wave in the rod.

3. The control system according to claim 1, wherein the second parameter is a frequency interval between two resonant frequencies of the rod.

4. The control system according to claim 1, wherein the calculator is suitable for determining the value of the rod tightening also as a function of a parameter (κ) relating to the rod.

5. The control system according to claim 4, wherein the calculator is suitable for calculating a value F of the rod tightening by applying the following formula:

$$F = \frac{1}{\kappa}\sqrt{1 - t_\sigma . f_\sigma^1}$$

where:
    κ is the rod parameter,
    $t_\sigma$ is a time of flight of an ultrasonic excitation in the rod, and $$f_\sigma^1$$

is a frequency interval between two resonant frequencies of the rod.

6. The control system according to claim 1, wherein the first measuring device comprises:
    a first ultrasonic probe arranged to generate an ultrasonic excitation of the rod and collect a rod response signal to the generated excitation, and
    a first acquisition device, the first acquisition device being suitable for controlling the first ultrasonic probe according to a first control law and receiving the response signal, the first control law being an impulse law,
    wherein the response signal is processed to extract the first parameter.

7. The control system according to claim 6, wherein a principal axis for the rod is defined, wherein the first ultrasonic probe is arranged to generate an ultrasonic excitation propagating along the principal axis of the rod.

8. The control system according to claim 1, wherein the second measuring device comprises:
    a second ultrasonic probe arranged to generate an ultrasonic excitation of the rod and collect a plurality of rod response signals to the generated excitation, and
    a second acquisition device, the second acquisition device being suitable for controlling the second ultrasonic probe according to a second control law and for receiving the plurality of response signals, the second control law comprising a pulse train at different frequencies,
    wherein the plurality of response signals are processed to extract the second parameter.

9. The control system according to claim 8, wherein a frequency analysis of the plurality of response signals is performed to extract the second parameter.

10. The control system according to claim 1, wherein the first measuring device comprises
    a first ultrasonic probe arranged to generate an ultrasonic excitation of the rod and collect a rod response signal to the generated excitation, and
    a first acquisition device, the first acquisition device being suitable for controlling the first ultrasonic probe according to a first control law and receiving the response signal, the first control law being an impulse law, wherein the response signal is processed to extract the
first parameter;

the second measuring device comprises a second ultrasonic probe arranged to generate an
ultrasonic excitation of the rod and collect a plurality 5
of rod response signals to the generated excitation,
and a second acquisition device, the second acquisition
device being suitable for controlling the second
ultrasonic probe according to a second control law 10
and for receiving the plurality of response signals,
the second control law comprising a pulse train at
different frequencies, wherein the plurality of response signals are processed
to extract the second parameter; and 15 the first ultrasonic probe and the second ultrasonic probe
are merged and comprise an ultrasonic transducer made
of lead titano-zirconates.

*   *   *   *   *